(12) United States Patent
Riddle et al.

(10) Patent No.: US 11,287,074 B2
(45) Date of Patent: Mar. 29, 2022

(54) DEVICE AND METHOD FOR REPAIRING PIPE LEAKAGE

(71) Applicants: Scot Riddle, Lancaster, CA (US); Ed Donovan, Lancaster, CA (US)

(72) Inventors: Scot Riddle, Lancaster, CA (US); Ed Donovan, Lancaster, CA (US)

( * ) Notice: Subject to any disclaimer, the term of this patent is extended or adjusted under 35 U.S.C. 154(b) by 157 days.

(21) Appl. No.: 16/670,135

(22) Filed: Oct. 31, 2019

(65) Prior Publication Data
US 2020/0072404 A1    Mar. 5, 2020

(51) Int. Cl.
| | | |
|---|---|---|
| *F16L 43/00* | (2006.01) | |
| *F16L 55/16* | (2006.01) | |
| *F16L 11/06* | (2006.01) | |

(52) U.S. Cl.
CPC ......... *F16L 55/1608* (2013.01); *F16L 43/008* (2013.01); *F16L 11/06* (2013.01)

(58) Field of Classification Search
CPC ..... F16L 55/18; F16L 55/1608; F16L 43/008; F16L 11/06; F16L 51/00; F16L 51/04; F16L 41/007; F16L 27/0845; F16L 43/00; E03C 1/22
USPC .................. 285/13, 15, 18, 23, 27, 179, 224
See application file for complete search history.

(56) References Cited

U.S. PATENT DOCUMENTS

| | | | |
|---|---|---|---|
| 1,156,907 A | * | 10/1915 | King |
| 2,286,239 A | * | 6/1942 | Sors ............................... 285/179 |
| 6,976,710 B1 | | 12/2005 | Bedford |
| 2003/0074955 A1 | * | 4/2003 | Smith ....................... F16L 55/18 |
| 2010/0133804 A1 | * | 6/2010 | Larkin ................. F16L 55/1608 |
| 2019/0360185 A1 | * | 11/2019 | Schumacher ............. E03C 1/22 |

OTHER PUBLICATIONS

Orvar, "How To Bend PVC & Make Incredible Shapes", Oct. 25, 2017, https://www.youtube.com/watch?v=AYTFDkX7s24.
Altos, "PVC Bendit", May 6, 2011, https://www.youtube.com/watch?v=bOVTC7xokFU.
Username GHOSTSQUATTER1, "Broken underground PVC Pipe Fix", Jan. 5, 2014, https://www.youtube.com/watch?v=QlzrjG7MLYA.
Username ADAMDIY, "How to repair a broken PVC sprinkler pipe", Sep. 11, 2014, https://www.youtube.com/watch?v=Eum5ZeVKHOA.
Username ELECTRONICSNMORE, "Easily Repairing Broken PVC Pipes (Least Amount of Digging)", Oct. 22, 2015, https://www.youtube.com/watch?v=x7NWmdlvVIQ.

* cited by examiner

*Primary Examiner* — Zachary T Dragicevich
*Assistant Examiner* — William S. Choi
(74) *Attorney, Agent, or Firm* — Scot Fagerland

(57) ABSTRACT

A device for repairing pipe leakage takes the form of a short section of PVC pipe with fittings. The pipe is ideally a 1'-2' section fashioned into a U-bend with a substantially semi-circular bend and two arms, and the fittings take the form of an elbow joint glued onto each arm. The arms are ideally offset up to 5° from parallel. A method of repairing cracked PVC piping using the device involves cutting out a 4"-6" section of piping, gluing the exposed ends of the broken piping as well as the elbow joints, squeezing the U-bend, positioning the squeezed device into the gap in broken piping, and releasing the U-bend to fit the elbow joints over the exposed ends of broken piping. The device has no vulnerable moving parts or O-rings, and it obviates the need to remove entire pipes.

15 Claims, 6 Drawing Sheets

DEVICE AND METHOD FOR REPAIRING PIPE LEAKAGE

1. FIELD OF THE INVENTION

This invention is in the field of plumbing, specifically methods for repairing a leak in PVC water piping.

2. BACKGROUND OF THE INVENTION

Plastic lawn sprinkler systems utilize long segments of pipe beneath the ground. While some piping is made of polyethylene, superior systems are made of rigid poly(vinyl chloride), PVC. Industry standards are 20 feet for the pipe length; ½", ¾", or 1" for the pipe diameter; and "Schedules" 40 and 80 for wall thickness. Schedule 40 pipe is usually preferred for sprinkler systems. Under normal conditions, Schedule 40 PVC pipe is rated to withstand a water pressure of 200 psi.

PVC pipes are fastened together with fittings, most typically at an angle of 90° or 180°. A 90° fitting is called an elbow joint; a 180° fitting is called straight. Glue is used to secure pipe to fittings. Properly installed fittings are stronger than the pipes themselves, rated at 450 psi.

When a pipe breaks, the conventional method of repair is to replace the entire length of pipe containing the rupture (e.g. a 20-foot segment). Such repair requires digging a trench 20 feet long in order to access the fittings at both ends of the pipe.

An alternative method of repair involves pinpointing the rupture and cutting out a short length of pipe, extending a few inches to either side of the rupture. This provides the advantage of digging only a short trench. The gap in the pipe must then be repaired with a short length of pipe and/or fittings.

3. DESCRIPTION OF RELATED TECHNOLOGY

Currently known methods and parts for repairing short sections of pipe all have shortcomings. The "obvious" solution would be to cut a short section of replacement pipe the same length as the removed section, glue straight fittings on each end of the replacement pipe, and then glue those fittings onto the exposed ends of the broken pipe. The problem with this method is that the fitting creates a few extra inches of length on each end of the replacement section. Since PVC can not be compressed, the only way to get the broken pipe into the replacement fittings is with serious angling (e.g. lifting the exposed ends of the broken pipe above ground level), which (if possible at all) puts stress on the system and could cause further damage.

Several specialized fittings are well known and easily available on the market. The general problem that they have in common is that they introduce weak junctures into the system.

One type of specialized fitting is the expansion coupling, also known as the slip fix. The slip fix has a telescoping structure; a narrower section of pipe slides in or out of a larger section of pipe. This resolves the issue of the replacement pipe's length exceeding the repair gap. The slip fix has two components secured together with threads, and it uses O-rings to keep a seal. The downside to the slip fix is its vulnerability to failure. Care must be taken during installation to keep the threads and O-rings perfectly clean. The slip fix is known to become brittle over time, and its O-rings are especially susceptible to rigidity, dislocation, or deterioration with age.

A compression coupling is another repair solution. It provides a short section of replacement pipe called the central sleeve, and two compression ends that screw onto the central sleeve. Each compression end includes a rubber bushing for a watertight seal. The compression coupling is installed by unscrewing the compression ends and sliding them onto the exposed ends of broken pipe, positioning the sleeve between them in the gap, and then screwing the compression ends back onto the sleeve. This coupling requires cleanliness during assembly as well as the use of two Channel lock pliers or the equivalent. It, too, will wear out over time as the rubber bushings age. Also, it cannot take a side load without leakage. At times, these fittings can move longitudinally along the pipe with water flows and pressures. They have been known to completely blow off the end of a repaired pipe.

A third specialized fitting is the union, which is effective for gaps of about two inches. The union has two cylindrical components that screw together. To install the union, the two cylindrical components are separated, and one is glued to each end of exposed pipe. The two cylindrical components are then screwed back together. One of the cylinders fits inside the other. An O-ring keeps a tight seal between them. This method requires precise installation, and again care must be taken to keep the O-ring clean and precisely positioned. Installing a union requires one or two sets of pliers. Over time, it is subject to failures as the O-ring wears out.

The final example of a specialized repair fitting is the flexible coupling. Here, the replacement pipe is made of a flexible rubbery plastic like a garden hose. It is fitted with a rigid PVC fitting on each end. The PVC fittings are glued to the exposed ends of the broken pipe. The flexible coupling provides an easy way to fit the replacement section into a tight gap; it may be bowed during or after installation. The problem is that it is not designed to endure high pressure or constant pressure. It will balloon and eventually break if subjected to such water pressure for extended periods of time.

All the fittings described in this section are typically priced at about $5 each.

What is needed is a repair fitting for PVC pipe that fits into tight spots, maintains the strength of the original piping without introducing weak points, and is inexpensive.

4. SUMMARY OF THE INVENTION

As an article of manufacture, the invention is a short section of PVC pipe with fittings. In its best embodiment, the pipe takes the form of a PVC U-bend and the fittings take the form of an elbow joint glued onto each end of the U-bend. With no threads, moving parts, or O-rings, the invention consists entirely of PVC pipe and fittings. It will therefore be just as strong as the original section of pipe.

A second aspect of the invention is a process of making the described article of manufacture. The method involves heating PVC piping to approximately 300° F., inserting a mandrel, bending the mandrel in order to bend the pipe without kinking, and letting the pipe cool and harden in a U-shape.

A third aspect of the invention is a method of repairing PVC pipe using said article of manufacture. First, a short section of pipe is removed at the break. The article is set into place by applying glue to the interior of the elbow joints and the exterior of the exposed ends of the broken pipe, then squeezing the U-bend so that the elbow joints fit in the gap between the exposed ends of broken pipe, and then releasing the U-bend so that the elbow joints slide into place on the exposed ends of broken pipe. This process does not require any assembly at the fix site. It does not require replacing the entire length of broken pipe, which saves great time and effort when replacing sprinkler pipes or other pipes underground. This process provides the quick, easy, durable, inexpensive solution sought above.

To summarize the advantages of this invention, we know of no other "full pressure" pipe repairs that retain "glue only" joint system integrity. All other repair devices involve grommets, O-rings, or materials rated less than schedule 40 full pressure.

5. BRIEF DESCRIPTION OF THE DRAWINGS

6. DETAILED DESCRIPTION OF THE PREFERRED EMBODIMENTS

Figure 1:
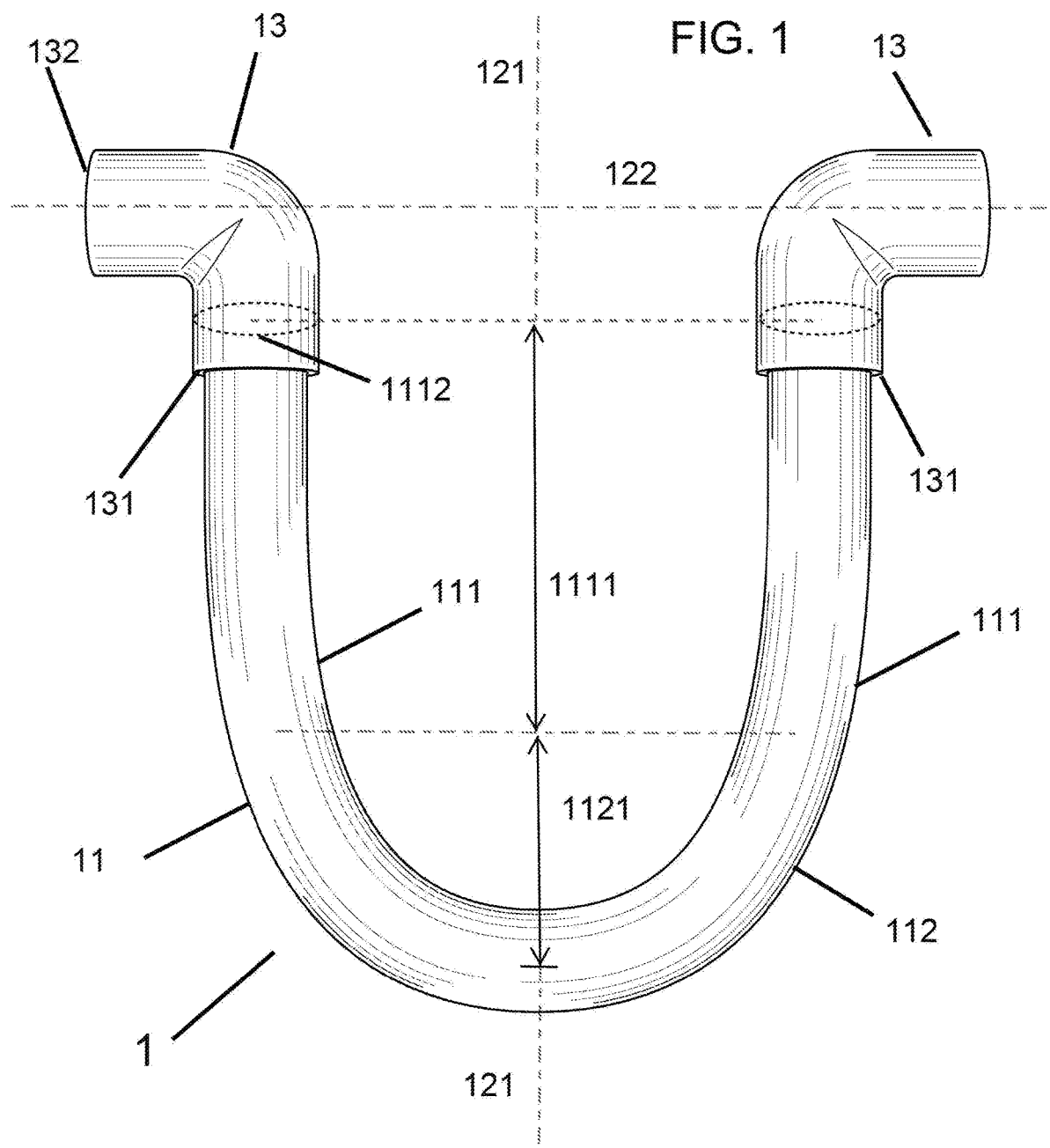
FIG. 1 is a front view of the device showing its main features and geometry.
Figure 2:
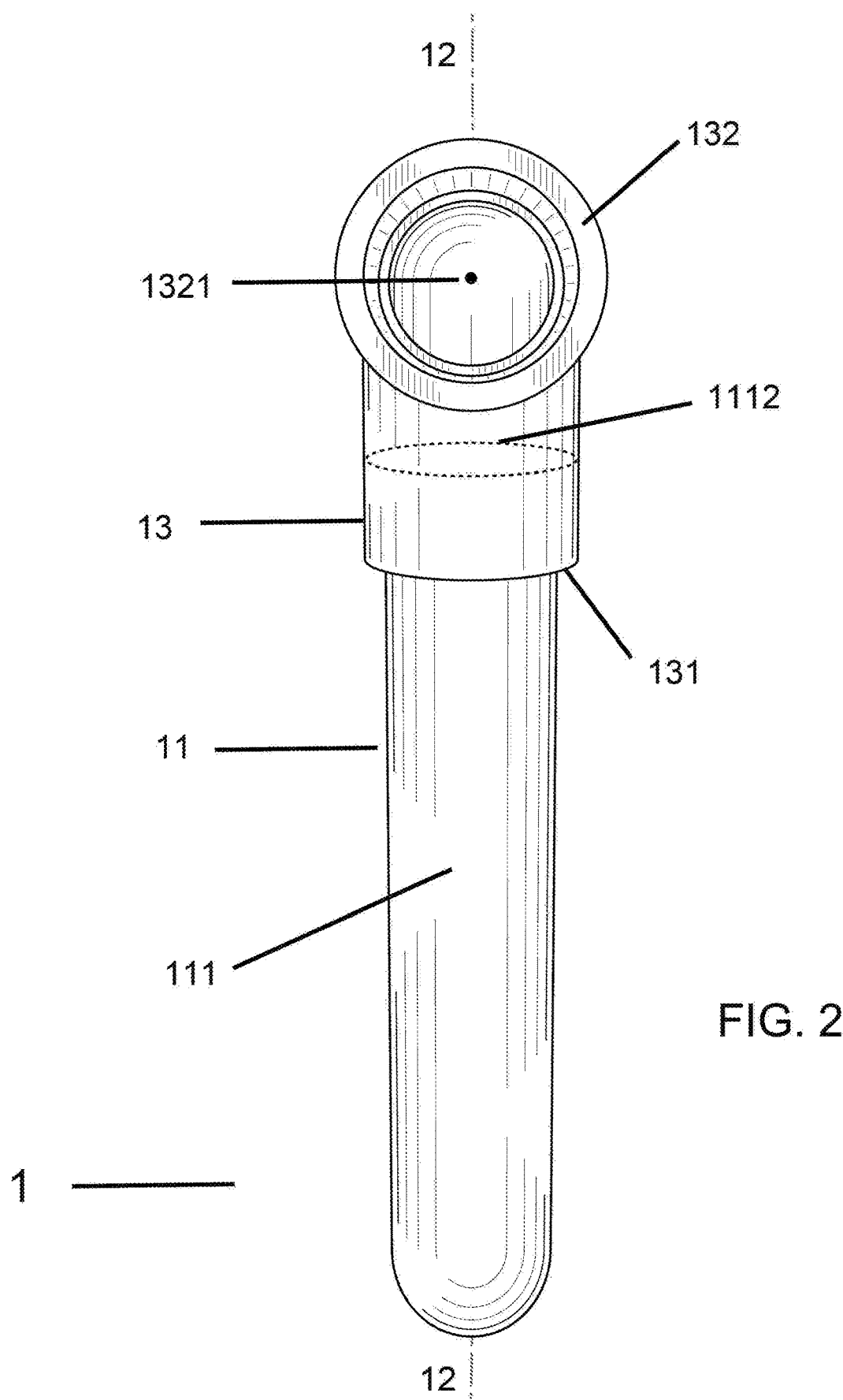
FIG. 2 is a side view of the device.

The article of manufacture 1 includes a segment of PVC pipe 11, ideally ½"-1" in diameter and approximately 1' to 2' long. The pipe is configured in a "U" shape, comprising two arms 111 and a semi-circular bend 112 with a bend radius 1121. The arms are parallel, and they have an equal arm length 1111. Each arm has an end 1112 (not seen in the figures).

To refer to the geometry of article 1, we take note of the imaginary plane 12 containing the "U", and the imaginary midline 121 that lies in the imaginary plane and is equidistant from the two arms.

Figure 3:
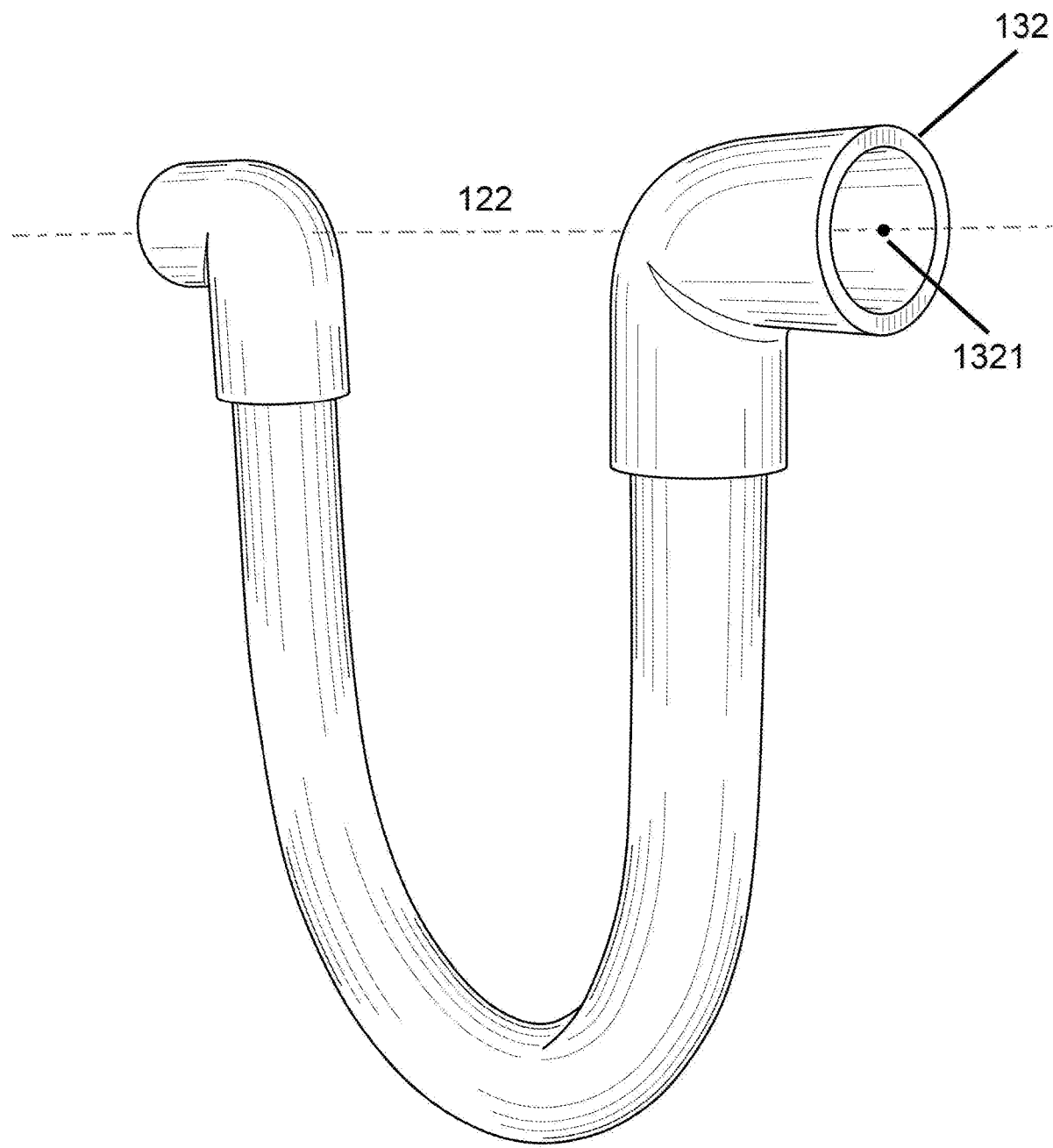
FIG. 3 is a perspective view of the device.

The device further comprises two elbow joints 13, preferably 90° joints. Each elbow joint has a proximal end 131 and a distal end 132. Each distal end is circular and has a center 1321. The proximal end of each elbow joint is affixed to the end 1112 of one arm, ideally with plumbing adhesive. The distal ends of the elbow joints open in opposite directions from one another. An imaginary axis 122 runs through both centers 1321 of the distal ends 132. This common axis 122 lies in the aforementioned imaginary plane 12 and is perpendicular to the arms and to the imaginary midline 121. In an alternative embodiment, the elbow joints are modified with elbow angle between 85° and 95°, as seen in FIGS. 1 and 3.

To assemble the article, a straight segment of PVC pipe 11 is first heated to a temperature ideally in the range of 275° to 325° F. Heating the plastic makes it supple. Bending the pipe without the assistance of further tools would create unwanted kinks and weaknesses. To preserve structural integrity, a mandrel is inserted through the segment of pipe while it is hot but still straight. The mandrel is bent in the desired configuration. That is, at the midpoint between the two ends 1112 of the pipe, the mandrel is bent into a semicircular bend 112 with the desired bend radius 1121. The rest of the mandrel remains straight, thus forming the aforementioned arms 111 as described. The pipe is allowed to cool, harden, and reset in the bent configuration before the mandrel is removed. Finally, elbow joints 13 are glued onto the end of each arm, in the configuration described above.

The article is ideal for repairing a small fracture in PVC piping by the following method. The broken pipe 2 is cut to either side of the fracture, at a distance from the fracture slightly larger than the bend radius 1121. The cut segment of broken pipe 2 is removed, leaving two exposed ends 21. Glue is applied to the exposed ends of the broken pipe and to the interior of the elbow joints 13 on the invention.

Figure 4:
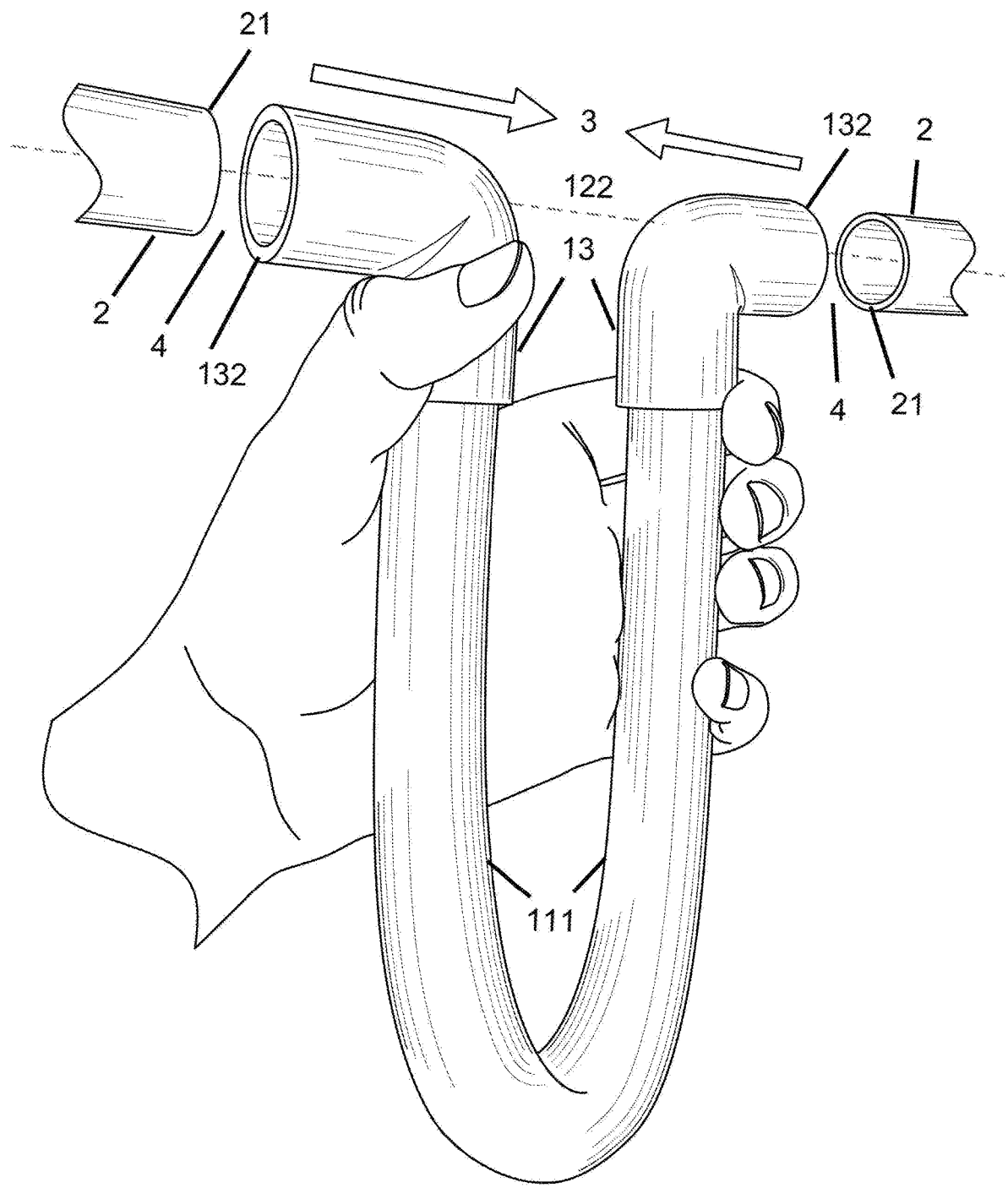
FIG. 4 illustrates the method of repairing pipe using the device.
Figure 5:
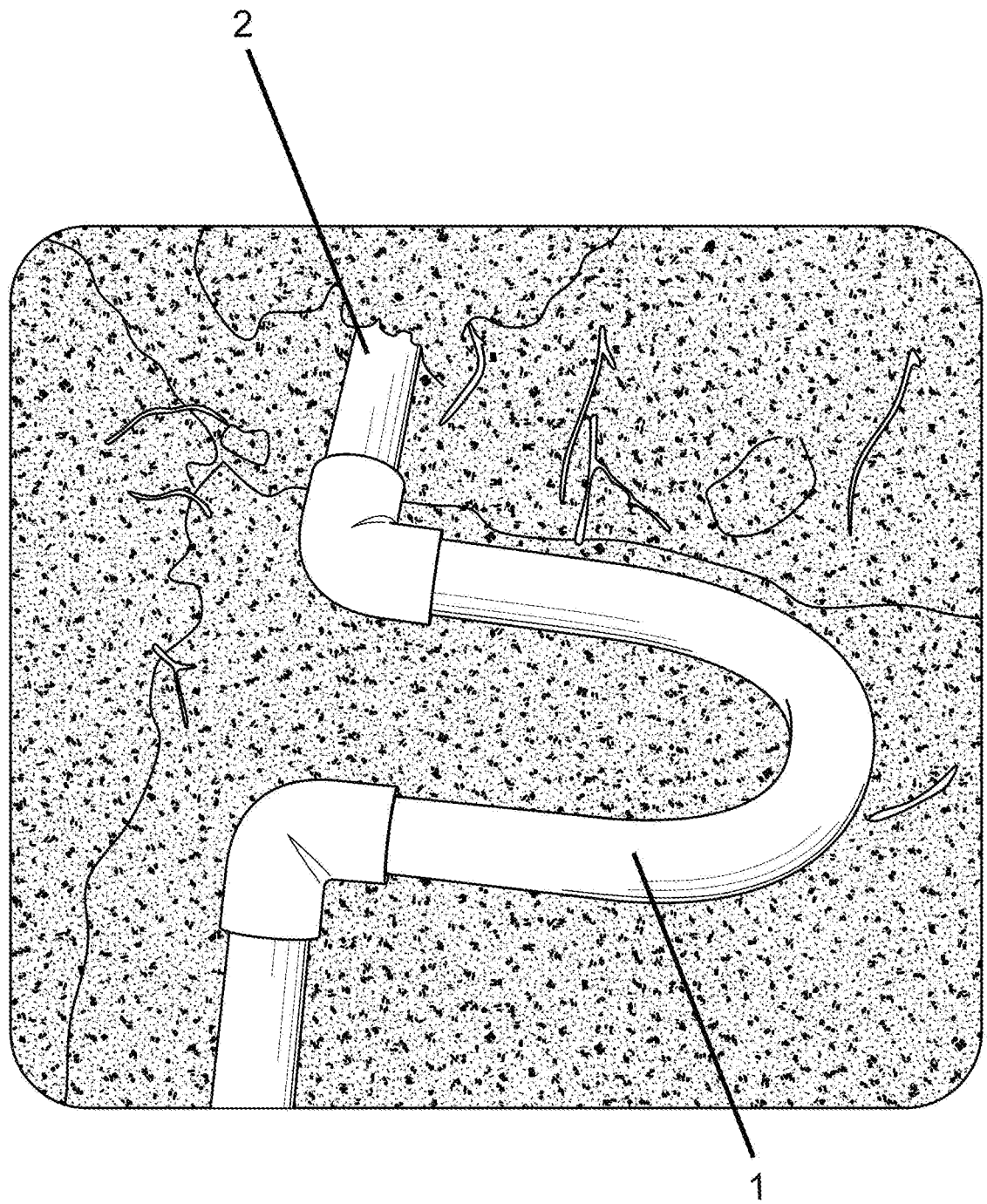
FIG. 5 shows the device in place as a repair unit on PVC piping.

The article is squeezed with squeeze force 3 so that the two elbow joints 13 are displaced toward each other along their common axis 122, as shown in FIG. 4. The article is then positioned in the gap between the exposed ends of broken pipe 21 so that the imaginary axis 122 aligns with the length of broken pipe 2. There will momentarily be a displacement gap 4 between each exposed end of broken pipe 21 and the distal end of an elbow joint 132. The squeeze force 3 is then relaxed so that the arms 111 spring back into equilibrium position. This action will close the displacement gaps 4 and bring the elbow joints 13 into position to fit over the exposed ends of broken pipe 21. When the glue sets, the broken pipe 2 and this article 1 will form one continuous pipe system as seen in FIG. 5. The new system will be at least as strong as the original pipe.

Best Mode Parameters

In our experience, we find that the invention works best when the squeeze force 3 due to an average one-handed human grip as illustrated in FIG. 4 will displace the elbow joints about 1.5" toward each other, i.e. ¾" for each displacement gap 4. A typical squeeze force for a grip as shown in FIG. 4 is 60-80 pounds, i.e. 30-40 pounds on each arm of the device. These parameters indicate that the device should have a spring constant of roughly 40-50 lb/in.

The spring constant is a function of the pipe diameter, the arm length 1111, and the bend radius 1121. Our experimentation has shown that the spring constant varies much more with arm length than with bend radius. Therefore, the bend radius is engineered to meet other concerns as well, such as fitting the human hand and accommodating a reasonable length of pipe removal.

In its best mode, the uniqueness of the device is its 40-50 pound per inch restorative force. Such force allows glue joint adhesion to take place without the need for steady and constant hand pressure. It also allows for one-handed installation in what could be considered difficult locations.

In order to achieve this optimal spring constant, experimentation has shown that the ideal dimensions for Schedule 40 pipe are the following.

For ½" pipe, the optimal bend radius is approximately 2.25" and the optimal arm length is approximately 4.5".

For ¾" pipe, the optimal bend radius is approximately 2.5" and the optimal arm length is approximately 6".

For 1" pipe, the optimal bend radius is approximately 2.5" and the optimal arm length is approximately 7.5".

Figure 6:
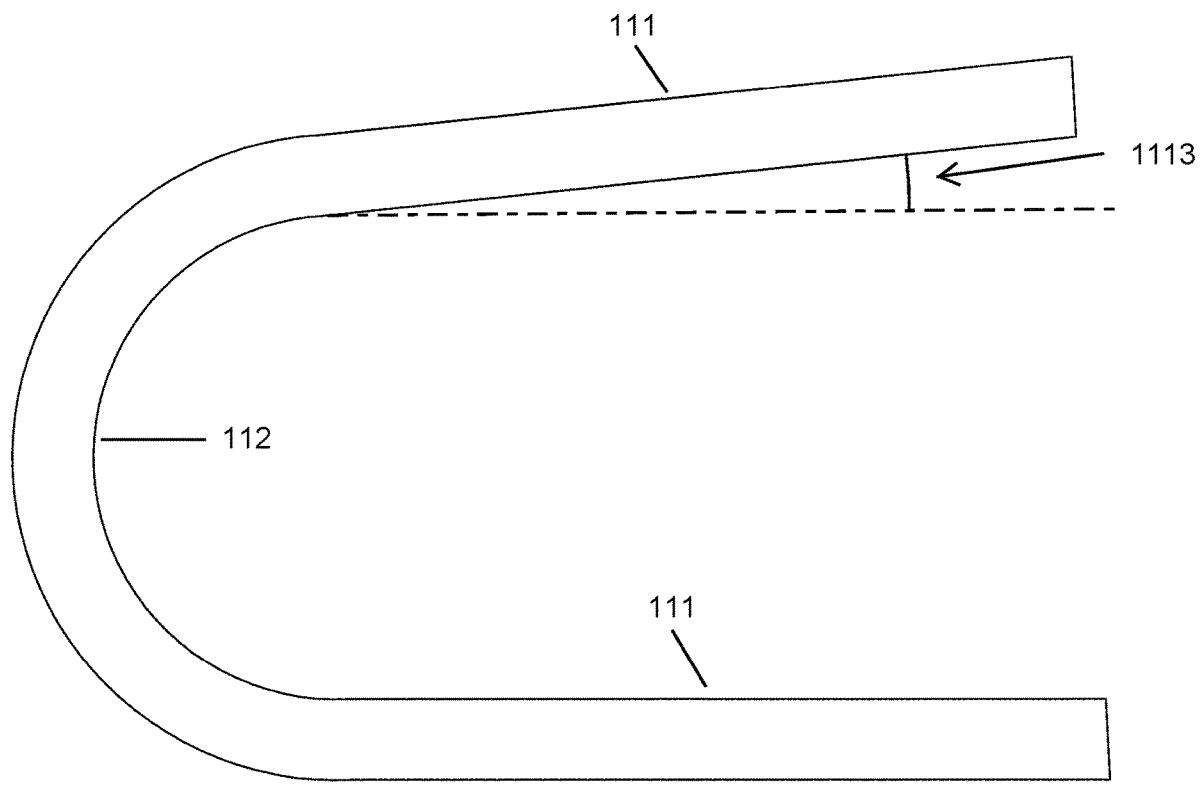
FIG. 6 is a stylized illustration of the device used to illustrate the angular offset of the arms.

The squeeze force displaces the arms in terms of angle as well as distance. The squeeze parameters discussed above will displace the arms roughly 5° from their rest position. This causes misalignment in the elbow joints so that they do not both line up perfectly with the broken pipe. To compensate, we provide an alternative embodiment with an arm offset angle 1113, seen in FIG. 6. The arm offset angle is defined by the angle by which one arm 111 deviates from the parallel to the other arm. The arm offset angle 1113 is ideally in the range of 0-5°; greater deviation makes the product look malformed and is not necessary for typical squeeze forces.

We claim:

1. A plumbing repair device, comprising
   a U-bend of PVC pipe, comprising a first arm, a second arm substantially parallel to the first arm, and a substantially semi-circular bend connecting the first arm to the second arm;
   an end on each arm;
   the entire device lying in an imaginary plane, said plane containing an imaginary midline parallel to and equidistant from the first and second arms, and said plane also containing an imaginary axis perpendicular to the midline;
   a first elbow joint and a second elbow joint, each elbow joint having a proximal end and a distal end, each distal end having a center;
   the proximal end of the first elbow joint being secured to the end of the first arm, and the proximal end of the second elbow joint secured to the end of the second arm;
   such that the elbow joints are oriented with their distal ends facing in opposite directions, with the imaginary axis passing through the centers of the two distal ends;
   said device having a spring constant between 30 pounds per inch and 50 pounds per inch, as applied to a squeeze force displacing the ends of the arms along the imaginary axis toward the imaginary midline.

2. The device of claim 1, wherein
   the second arm is offset from parallel to the first arm with an offset angle not exceeding 5°.

3. The device of claim 2, wherein the second arm is offset from parallel to the first arm with an offset angle exceeding 3°.

4. A plumbing repair device, comprising
   a U-bend of PVC pipe between ½" and 1" in diameter, comprising a first arm, a second arm substantially parallel to the first arm, and a substantially semi-circular bend connecting the first arm to the second arm;
   each arm having arm length between 3" and 9";
   said bend having bend radius between 2" and 3";
   an end on each arm;
   the entire device lying in an imaginary plane, said plane containing an imaginary midline parallel to and equidistant from the first and second arms, and said plane also containing an imaginary axis perpendicular to the midline;
   a first elbow joint and a second elbow joint, each elbow joint having a proximal end and a distal end, each distal end having a center;
   the proximal end of the first elbow joint being secured to the end of the first arm, and the proximal end of the second elbow joint secured to the end of the second arm;
   such that the elbow joints are oriented with their distal ends facing in opposite directions, with the imaginary axis passing through the centers of the two distal ends.

5. The device of claim 4, wherein
   the pipe has a diameter between ⅜" and ⅝";
   the arm length is between 4" and 5";
   and the bend radius is between 2" and 2.5".

6. The device of claim 5, wherein
   the second arm is offset from parallel to the first arm with an offset angle not exceeding 5°.

7. The device of claim 6, wherein the second arm is offset from parallel to the first arm with an offset angle exceeding 3°.

8. The device of claim 4, wherein
   the pipe has a diameter between ⅝" and ⅞";
   the arm length is between 5.5" and 6.5";
   and the bend radius is between 2.25" and 2.75".

9. The device of claim 8, wherein
   the second arm is offset from parallel to the first arm with an offset angle not exceeding 5°.

10. The device of claim 9, wherein the second arm is offset from parallel to the first arm with an offset angle exceeding 3°.

11. The device of claim 4, wherein
    the pipe has a diameter between ⅞" and ⅝";
    the arm length is between 7" and 8";
    and the bend radius is between 2.25" and 2.75".

12. The device of claim 11, wherein
    the second arm is offset from parallel to the first arm with an offset angle not exceeding 5°.

13. The device of claim 12, wherein the second arm is offset from parallel to the first arm with an offset angle exceeding 3°.

14. The device of claim 4, wherein
    the second arm is offset from parallel to the first arm with an offset angle not exceeding 5°.

15. The device of claim 14, wherein the second arm is offset from parallel to the first arm with an offset angle exceeding 3°.

* * * * *